US008812586B1

(12) United States Patent
Kulkarni et al.

(10) Patent No.: US 8,812,586 B1
(45) Date of Patent: Aug. 19, 2014

(54) CORRELATING STATUS INFORMATION GENERATED IN A COMPUTER NETWORK

(75) Inventors: Rahul S. Kulkarni, Maharashtra (IN); Vivek Sahasranaman, Bangalore (IN); Rohit Jain, Bangalore (IN); Vittaldas Sachin Shenoy, Calicut (IN); Pankaj Risbood, Bangalore (IN); Parag Kacharulal Sarda, Bangalore (IN)

(73) Assignee: Google Inc., Mountain View, CA (US)

( * ) Notice: Subject to any disclaimer, the term of this patent is extended or adjusted under 35 U.S.C. 154(b) by 302 days.

(21) Appl. No.: 13/027,872

(22) Filed: Feb. 15, 2011

(51) Int. Cl.
G06F 15/16 (2006.01)

(52) U.S. Cl.
USPC ........................................................ 709/203

(58) Field of Classification Search
USPC ........... 709/203, 223–226; 718/100, 102, 105
See application file for complete search history.

(56) References Cited

U.S. PATENT DOCUMENTS

| | | | |
|---|---|---|---|
| 5,463,768 A | | 10/1995 | Cuddihy et al. |
| 5,655,081 A * | | 8/1997 | Bonnell et al. ................. 709/202 |
| 5,778,444 A | | 7/1998 | Langan et al. |
| 6,178,482 B1 | | 1/2001 | Sollars |
| 6,343,320 B1 * | | 1/2002 | Fairchild et al. ............... 709/224 |
| 6,505,211 B1 | | 1/2003 | Dessloch et al. |
| 6,505,248 B1 * | | 1/2003 | Casper et al. ................. 709/224 |
| 6,598,179 B1 | | 7/2003 | Chirashnya et al. |
| 6,643,613 B2 * | | 11/2003 | McGee et al. ................. 702/186 |
| 6,816,905 B1 * | | 11/2004 | Sheets et al. ................... 709/226 |
| 6,898,697 B1 | | 5/2005 | Gao et al. |
| 6,959,265 B1 * | | 10/2005 | Candela et al. ............... 702/186 |
| 6,996,502 B2 * | | 2/2006 | De La Cruz et al. .......... 702/188 |
| 7,062,718 B2 | | 6/2006 | Kodosky et al. |
| 7,117,243 B2 | | 10/2006 | Peart |
| 7,478,388 B1 | | 1/2009 | Chen et al. |
| 7,529,836 B1 | | 5/2009 | Bolen |
| 7,596,620 B1 | | 9/2009 | Colton et al. |
| 7,650,331 B1 | | 1/2010 | Dean et al. |
| 7,653,833 B1 | | 1/2010 | Miller et al. |
| 7,761,573 B2 | | 7/2010 | Travostino et al. |
| 7,804,862 B1 | | 9/2010 | Olson et al. |
| 7,836,285 B2 | | 11/2010 | Giri et al. |
| 8,103,771 B2 * | | 1/2012 | Tanaka et al. ................. 709/226 |
| 8,146,147 B2 | | 3/2012 | Litvin et al. |

(Continued)

OTHER PUBLICATIONS

Apache HTTP Server Version 2.0. "Log Files." [Retrieved on Feb. 15, 2011]. Retrieved from the Internet <URL: http://httpd.apache.org/docs/2.0/logs.html> (7 pages).

(Continued)

*Primary Examiner* — Andrew Chriss
*Assistant Examiner* — Jose Perez
(74) *Attorney, Agent, or Firm* — Fish & Richardson P.C.

(57) ABSTRACT

In general, the subject matter described in this specification can be embodied in methods, systems, and program products for correlating status information generated in a computer network. A computing system receives, for each particular computer server or application program in a group of computer servers and application programs that are executing on the computer servers, information that identifies statuses of the particular computer server or application program at a plurality of times. The computing system generates, using the information received, network signatures that each represent statuses of the computer servers and application programs in the group for a particular time, the network signatures being for multiple times. The computer system stores the network signatures along with data that identifies relationships, for each of the multiple times, between (i) application programs and the computer servers on which they were executing, and (ii) application programs that were in communication with each other.

16 Claims, 10 Drawing Sheets

(56) References Cited

U.S. PATENT DOCUMENTS

| | | | |
|---|---|---|---|
| 8,261,295 | B1 | 9/2012 | Risbood et al. |
| 8,276,140 | B1 | 9/2012 | Beda et al. |
| 2002/0091902 | A1 | 7/2002 | Hirofuji |
| 2004/0139368 | A1 | 7/2004 | Austen et al. |
| 2004/0268358 | A1* | 12/2004 | Darling et al. ............... 718/105 |
| 2005/0010715 | A1* | 1/2005 | Davies et al. ............... 711/100 |
| 2005/0021605 | A1* | 1/2005 | Davies et al. ............... 709/203 |
| 2005/0166011 | A1 | 7/2005 | Burnett et al. |
| 2006/0059228 | A1* | 3/2006 | Kasamsetty et al. .......... 709/203 |
| 2006/0161753 | A1 | 7/2006 | Aschoff et al. |
| 2006/0294218 | A1* | 12/2006 | Tanaka et al. ............... 709/224 |
| 2007/0005761 | A1* | 1/2007 | Wolters ....................... 709/224 |
| 2007/0112956 | A1 | 5/2007 | Chapman et al. |
| 2007/0118694 | A1 | 5/2007 | Watanabe et al. |
| 2007/0199058 | A1 | 8/2007 | Baumgart et al. |
| 2007/0271604 | A1 | 11/2007 | Webster et al. |
| 2007/0280243 | A1 | 12/2007 | Wray et al. |
| 2007/0288921 | A1 | 12/2007 | King et al. |
| 2008/0086515 | A1 | 4/2008 | Bai et al. |
| 2008/0205415 | A1 | 8/2008 | Morales |
| 2008/0215796 | A1 | 9/2008 | Lam et al. |
| 2008/0222246 | A1* | 9/2008 | Ebling et al. ................. 709/203 |
| 2008/0244471 | A1 | 10/2008 | Killian et al. |
| 2008/0270704 | A1 | 10/2008 | He et al. |
| 2008/0307258 | A1* | 12/2008 | Challenger et al. ............. 714/20 |
| 2009/0097657 | A1 | 4/2009 | Schiedt et al. |
| 2009/0150629 | A1 | 6/2009 | Noguchi et al. |
| 2009/0199177 | A1 | 8/2009 | Edwards et al. |
| 2009/0222815 | A1 | 9/2009 | Dake |
| 2009/0241108 | A1 | 9/2009 | Edwards et al. |
| 2009/0249440 | A1 | 10/2009 | Platt et al. |
| 2009/0276771 | A1 | 11/2009 | Nickolov et al. |
| 2009/0300605 | A1 | 12/2009 | Edwards et al. |
| 2010/0057913 | A1 | 3/2010 | DeHaan |
| 2010/0071035 | A1 | 3/2010 | Budko et al. |
| 2010/0095000 | A1 | 4/2010 | Kettler et al. |
| 2010/0199089 | A1 | 8/2010 | Vysogorets et al. |
| 2010/0287548 | A1 | 11/2010 | Zhou et al. |
| 2011/0022812 | A1 | 1/2011 | van der Linden et al. |
| 2011/0085563 | A1 | 4/2011 | Kotha et al. |
| 2011/0103389 | A1 | 5/2011 | Kidambi et al. |
| 2011/0153838 | A1 | 6/2011 | Belkine et al. |
| 2011/0191485 | A1 | 8/2011 | Umbehocker |
| 2011/0231280 | A1 | 9/2011 | Farah |
| 2011/0258441 | A1 | 10/2011 | Ashok et al. |
| 2012/0185688 | A1 | 7/2012 | Thornton |
| 2012/0191912 | A1 | 7/2012 | Kadatch et al. |

OTHER PUBLICATIONS

Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427> (6 pages).
MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx> (4 pages).
Moller, Jan, et al., "Internal Network Security", Feb. 1, 2000-May 18, 2001, Retrieved from the Internet: <URL: http://www.daimi.au.dk/~fwiffo/thesis/>, 183 pages.
Primet, Pascale, et al.., "HIPCAL: State of the Art of OS and Network virtualization solutions for Grids", Sep. 14, 2007, 38 pages.
Abdull, AlastairIrvine, et al. "Generic Routing Encapsulation", [online] [retrieved on Jan. 4, 2011]. Retrieved from the Internet: <URL: http:// creativecommons. org/ licenses/ by-sa/ 3.0/>, 5 pages.
Farinacci et al., "RFC 2784: Generic Routing Encapsulation (GRE)", Mar. 2000, The Internet Society, 10 pages.
Kent et al., "RFC 4301: Security Architecture for the Internet Protocol", Dec. 2005, The Internet Society, 102 pages.
Wikipedia, "Domain Name System" [online]; Feb. 4, 2012; [Retrieved on Feb. 4, 2012]. Retrieved from the Internet: <URL: http://en.wikipedia.org/wiki/Domain_Name_System>, 16 pages.
Bucket Explorer. "What is my AWS Access and Secret Key." [Retrieved Apr. 26, 2011]. Retrieved from the Internet <URL: http://www.bucketexplorer.com/documentation/amazons-3--what-is-my-aws-access-and-secret-key.html>, 1 page.
Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.
Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.
Wikipedia. "OAuth." [online], Dec. 12, 2010; [Retrieved on Jan. 20, 2011] Retrieved from the Internet <URL: http://en.wikipedia.org/wiki/OAuth>; 3 pages.
Gowalla. "API Documentation—Oauth." [Retrieved on Apr. 26, 2011]. Retrieved from the Internet <URL: http://gowalla.com/api/docs/oauth>, 4 pages.
Apache HTTP Server Version 2.0. "Log Files." [Retrieved on Feb. 15, 2011]. Retrieved from the Internet <URL: http://httpd.apache.org/docs/2.0/logs.html>, 7 pages.
Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.
MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.
Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.
Wikipedia., Anycast [Retrieved on Oct. 10, 2011] Retrieved from the Internet: URL<http://en.wikipedia.org/wiki/Anycast>, 5 pages.
VMCI Overview [Retrieved on Jun. 8, 2011] Retrieved from the Internet: <URL: http://pubs.vmware.com/vmci-sdk/VMCI_intro.html>, 3 pages.
VMware vSphere [Retrieved on Jun. 8, 2011] Retrieved from the Internet: <URL: http://www.vmware.com/products/vmotion/overview.html>, 2 pages.
Travostino, Franco, et al., Seamless Live Migration of Virtual Machines over the MAN/WAN, 2006, Elsevier Future Generation Computer Systems 2006, 10 pages.
VMCI Datagram API [Retrieved on Jun. 8, 2011], Retrieved from the Internet: <URL: http://pubs.vmware.com/vmci-sdk/datagram.html>, 1 page.
VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.
VMCIDs_Lookup [Retrieved on Jun. 8, 2011], Retrieved from the Internet: <URL: http://pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.
OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).
Amazon Auto Scaling-Getting Started Guide-API Version Aug. 1, 2010. Amazon Web Services LLC, 2010, 20 pages.

(56) References Cited

OTHER PUBLICATIONS

Amazon Auto Scaling—Developer Guide—API Version Aug. 1, 2010. Amazon Web Services LLC, 2011, 62 pages.
Amazon CloudWatch—Developer Guide—API Version Aug. 1, 2010. Amazon Web Services LLC, 2010, 75 pages.
Benincosa. "Ganglia and Nagios, Part 2: Monitor enterprise clusters with Nagios—Install Nagios to effectively monitor a data center; make Ganglia and Nagios work together," 2009, 20 pages.
'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.
'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.
'Zabbix' [online]. "Zabbix 1.8: The Ultimate Open Source Monitoring Solution," 2001-2012, [retrieved on Feb. 3, 2011]. Retrieved from the Internet: URL: < http://www.zabbix.com/features.php.> 1 page.
Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.
Paravirtualization, Wikipedia Article, downloaded from http://en.wikipedia.org/wiki/Paravirtualization on Mar. 18, 2012.
Paravirtualized File Systems, Eric Van Hensbergen, downloaded from http://www.slideshare.net/ericvh/9p-on-kvm on Mar. 18, 2012.
"IPsec". Creativecommons.org [online]. Creative Commons Attribution-Share Alike 3.0 Unported, Nov. 11, 2010; [Retrieved on Jan. 14, 2011] Retrieved from the Internet: <URL: http://en.wikipedia.org/w/index.php?oldid=396193389>; pp. 1-8.
"Generic Routing Encapsulation". Creativecommons.org [online]. Creative Commons Attribution-Share Alike 3.0 Unported, Nov. 12, 2010; [Retrieved on Jan. 14, 2011]; Retrieved from the Internet: <URL: http://en.wikipedia.org/w/index.php?oldid=396280384>; pp. 1-5.
Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.
How To: Getting Started With Amazon EC2, Paul Stamatiou, Apr. 5, 2008. Retrieved from the Internet: <URL:http//paulstamatiou.com/how-to-getting-started-with-amazon-ec2>, 25 pages.
Uploading Personal ssh Keys to Amazon EC2, Eric Hammond, Oct. 14, 2010. Retrieved from the Internet: <URL:http://alestic.com/2010/10/ec2-ssh-keys>, 3 pages.
Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.
Managing Amazon EC2—SSH Login and Protecting Your Instances, Everyday's Findings, Monday, May 18, 2009, Retrieved from the Internet on Nov. 18, 2011; Retrieved from: <URL: http://blog.taggesell.de/index.php?/aarchives/73-Managing-Amazon-EC2., 6 pages.
Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.
Live Migration of Virtual Machines, Clark et al., University of Cambridge Laboratory, Department of Computer Science; University of Copenhagen, Denmark, 2005; 14 pages.
Making Services Easy to Migrate, Debian Administration, System Administration Tips and Resources, Jan. 1, 2005, 5 pages.
L. Gommans, et al., Token-Based Authorization of Connection Oriented Network Resources, 1st International Workshop on Networks for Grid Applications (GridNets 2004), Oct. 29th 2004; 8 pages.
Hyun, Ahn Ji, Authorized Officer for Korean Intellectual Property Office, International Search Report and Written Opinion for PCT/US2012/021846, International Search Report completed May 25, 2012, 8 pages.
Na, Lee Da, Authorized Officer for Korean Intellectual Property Office, International Search Report and Written Opinion for PCT/US2012/020954, International Search Report completed Aug. 23, 2012, 10 pages.
Alpern, B., "The Jalapeno virtual machine," IBM Systems Journal, Jan. 2000, vol. 39, Issue 1, pp. 211-238.
Bok, Jin Yo, Authorized Officer for Korean Intellectual Property Office, International Search Report and Written Opinion for PCT/US2012/029210, International Search Report completed Oct. 10, 2012, 2 pages.
Anonymous, Storage I/O Control Technical Overview and Consideration for Deployment VMware vSphere™ 4.1, Jan. 1, 2010, XP055044911, retrieved from the internet: URL: http://www.vmware.com/fled/pdf/techpaper/WMW-vSphere41-SIOC.pdf; [retrieved on Nov. 21, 2012], the entire document.
Cabellos et al., LISPmob: Mobile Networking through LISP, Apr. 2, 2012, 8 pages.

\* cited by examiner

US 8,812,586 B1

CORRELATING STATUS INFORMATION GENERATED IN A COMPUTER NETWORK

TECHNICAL FIELD

This document generally relates to computer networking.

BACKGROUND

A computer network can connect multiple computer servers, and each of the servers can operate one or more application programs. The network may be used by an organization to provide a computer-implemented service, for example, a social networking web site. Each of the servers can store status information in individual log files, where the status information describes conditions of the servers. For example, the log for each server may indicate a history of whether the server is online or offline, processing utilization of the server, and a network use by the server. The application programs can also store status information in logs. For example, the log for each application program can indicate recent processing errors that have been encountered by the application.

Providing a web page to a single user of the network, for example an individual that requested that his computer display a web page from the social network, may involve interactions among multiple different application programs on multiple different servers. Accordingly, an operational anomaly by a server or application program can impact the operation of other servers and application programs in the network.

SUMMARY

This document describes techniques, methods, systems, and mechanisms for correlating status information that is generated in a computer network. In general, a computer system may collect status information from servers and application programs in a computer network, and may occasionally generate a signature. A signature is a shortened version of the known statuses of the servers and application programs for a moment in time. The computer system may also occasionally generate data that identifies relationships between the computer servers and application programs at moments in time that correspond to the generated signatures.

The computer system may use the signatures and relationship data to determine whether an anomaly has occurred within the network, and an originating server or application program that was the source of the anomaly. The computer system may also use the signatures and relationship data to prevent an anomaly from spreading throughout the network to additional servers or application programs. The computer system may use historical anomalies along with signatures and relationship data that correspond to the historical anomalies to train a machine learning system to detect anomalies that are likely to occur. The machine learning system may detect anomalies that are likely to occur, and may use the signatures and relationship data to prevent the anomalies from occurring, or from spreading through the network.

In general, one aspect of the subject matter described in this specification can be embodied in a computer-implemented method for correlating status information generated in a computer network by computer servers and application programs. The method includes receiving, by a computing system and for each particular computer server or application program in a group of computer servers and application programs that are executing on the computer servers, information that identifies statuses of the particular computer server or application program at a plurality of times. The method includes generating, by the computing system and using the information received for each of the computer servers and the application programs, network signatures that each represent statuses of the computer servers and application programs in the group of computer servers and application programs for a particular time, the network signatures being for multiple times. The method includes storing, by the computing system, the network signatures along with data that identifies relationships, for each of the multiple times, between (i) application programs and the computer servers on which they were executing, and (ii) application programs that were in communication with each other.

Another aspect of the subject matter described in this specification can be embodied in a computer-implemented method for correlating status information generated in a computer network by computer servers and application programs. The method includes receiving, by a computing system and for each particular computer server or application program in a group of computer servers and application programs that are executing on the computer servers, information that identifies statuses of the particular computer server or application program at a plurality of times. The method includes generating, by the computing system and using the information received for each of the computer servers and the application programs in the group of computer servers and application programs, network signatures that each represent statuses of the computer servers and application programs in the group of computer servers and application programs for a particular time, the network signatures being for multiple times. The method includes receiving, by the computing system, data that identifies relationships, for each of the multiple times, between (i) application programs and the computer servers on which they were executing, and (ii) computer servers in communication with each other. The method includes providing to a machine learning system, to train the machine learning system, multiple previous anomalies in operation of computer servers and application programs from the group of computer servers and application programs and the data that identifies the relationships for times that correspond to the multiple previous anomalies. The method includes analyzing the data with the machine learning system to determine that an anomaly in operation of a specific computer server or application program from the group of computer servers and application programs is likely to occur in the future. The method includes reconfiguring the relationships between (i) application programs and the computer servers on which they were executing, and (ii) computer servers in communication with each other in order to avoid the predicted anomaly.

These and other implementations can optionally include one or more of the following features. The plurality of times for each particular computer server or application program may be indicated by a plurality of corresponding time stamps that were generated by the particular computer server or application program for receipt by the computing system. Generating the network signatures may include synchronizing time stamps from multiple of the computer servers and application programs that did not generate time stamps synchronously with each other. Generating the network signatures may include generating network signatures at periodic time intervals. The received information may not be received from all of the computer servers and application programs at periodic time intervals. Generating the network signatures may include generating multiple of the network signatures using (i) a single status from the information for a first computer server or application program from the group of computer servers and application programs, and (ii) multiple statuses from the information for a second computer server or application program from the group of computer servers and application programs.

The method may include detecting, during a monitoring of the network signatures as they are generated, an anomaly in the generated network signatures, by identifying that one or more network signatures do not conform to established normal behavior of the group of computer servers and application programs. The anomaly may be determined to represent an operational failure of an anomalous computer server or application program from the group of computer servers and application programs. The method may further include preventing the anomalous computer server or application program from affecting operation of a first computer server or application program by transferring requests by the first computer server or application program that were intended for receipt by the anomalous computer server or application program to a second computer server or application program. The method may include preventing the anomalous computer server or application program from affecting operation of a third computer server or application program by transferring subsequent requests by the third computer server or application program that were intended for receipt by the first computer server or application program to a fourth computer server or application program.

The data may further include statuses of the group of computer servers and application programs for the multiple times. The method may include analyzing the data with a machine learning system to determine that an anomaly in operation of a specific computer server or application program from the group of computer servers and application programs is likely to occur in the future. The method may include providing to the machine learning system, to train the machine learning system before determining that the anomaly is likely to occur, multiple previous anomalies in operation of computer servers and application programs from the group of computer servers and application programs and the data that identifies the relationships for times that correspond to the multiple previous anomalies. The method may include, in order to avoid the predicted anomaly, reconfiguring the relationships between (i) application programs and the computer servers on which they were executing, and (ii) application programs in communication with each other. Reconfiguring the relationships may include transferring execution of a first application program from a first computer server to a second computer server. The first computer server may be predicted by the machine learning system to be a source of the anomaly that is likely to occur in the future. The method may include bringing more computer servers online to avoid occurrence of the anomaly that is likely to occur in the future.

In yet another aspect, the subject matter described in this specification can be embodied in a computer system. The computer system includes a signature generator, at the computer system, to repetitively receive status information from computer servers in a group of computer servers and from application programs that are executing on the computer servers, and to periodically generate a network signature that indicates a status for each of the computer servers and application programs in the group based on most-recently received status information from each of the computer servers and application programs in the group. The computer system includes a graph generator, at the computer system, to generate data that represents, for multiple periodic time intervals: (i) the status for each of the computer servers and application programs in the group, and (ii) associations between computer servers and application programs in the group.

These and other implementations can optionally include one or more of the following features. The computer system may include an anomaly predictor, at the computer system, which is trained to identify anomalies in operation of computer servers and application programs in the group based on having received: (i) previous instances of anomalies in operation of computer servers and application programs in the group, and (ii) associations between computer servers and application programs upon or before occurrence of the anomalies, and that analyzes the generated data to determine that a predicted anomaly is likely to occur. The computer system may include anomaly predictor, at the computer system, to reconfigure the associations between the computer servers and application programs in the group in order to avoid the predicted anomaly.

Particular embodiments can be implemented, in certain instances, to realize one or more of the following advantages. The described systems and techniques can be used to identify servers or application programs that originally caused an error, even if the error identifies a different server or application program as being a source of the error. The described system can be used to minimize network utilization by allocating application programs to appropriate servers. The system can also be used to detect an anomaly in the network, and to prevent the anomaly from spreading to additional severs and application programs. The system can also be used to predict a likely anomaly before the likely anomaly occurs, and to prevent the likely anomaly from occurring.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
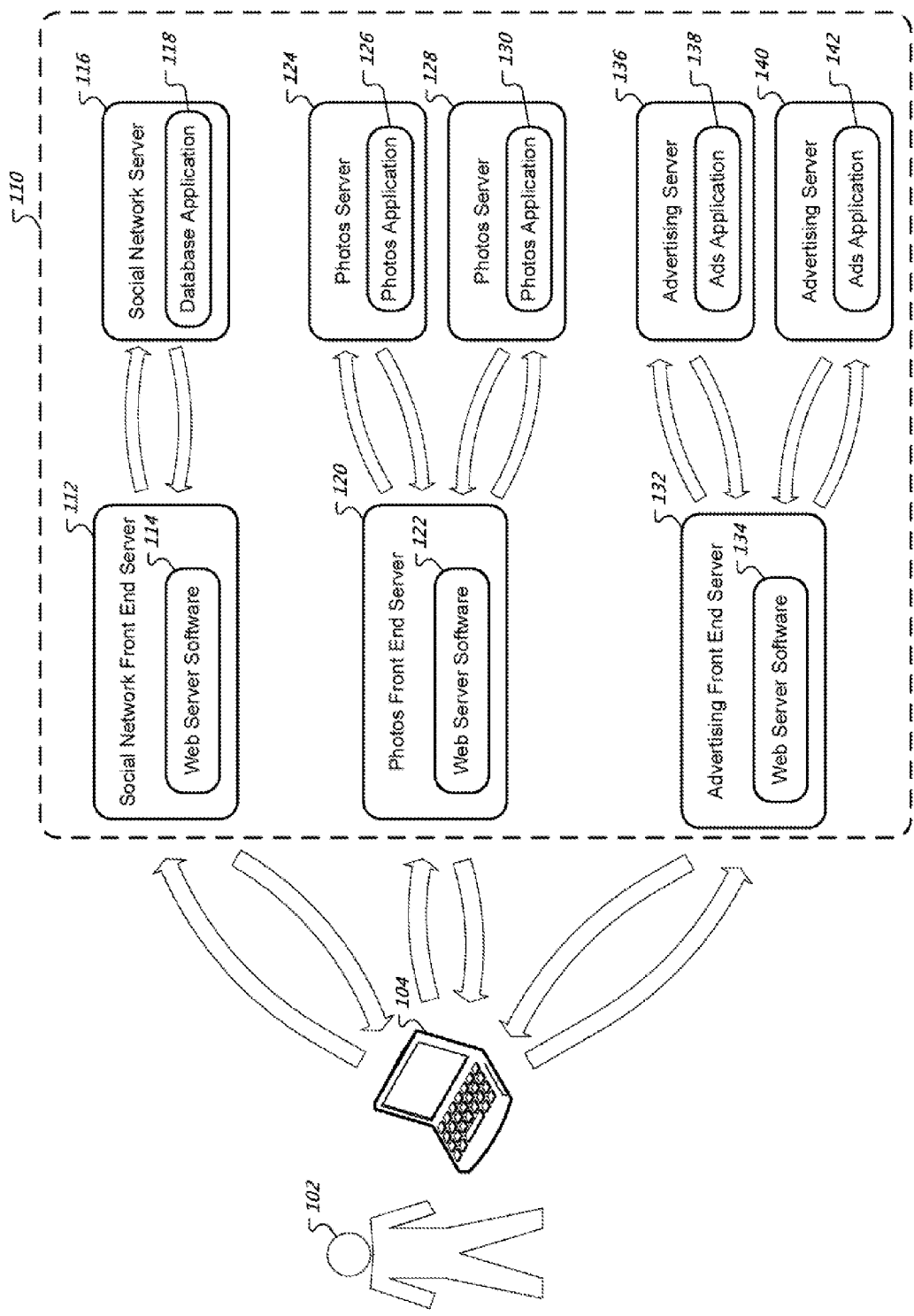
FIG. 1 shows a network of computer servers and application programs.

This document generally describes correlating status information that is generated in a computer network. In general, status information from individual computer servers and application programs in a network may be collected by a centralized system. The centralized system may generate periodic signatures that represent the statuses of all servers and application programs in the network. The signatures can be used to determine whether an anomaly has occurred in the operation of a server, in the operation of an application program, or in the operation of a collection of servers and application programs.

The centralized system may further generate data that represents relationships between servers and application programs in the network. Example relationships are formed between a server and an application program that is executing on the server, and between application programs that have recently communicated with each other. A collection of such relationship data may be stored along with every signature. Thus, the centralized system may store, for multiple different times, information that represents the statuses of servers and application programs in the network and the relationships between the servers and application programs.

The centralized system may generate the signatures at regular time intervals (e.g., every 10 seconds) even though the status information is irregularly received or generated by the servers and application programs. For example, a first server may transmit status information to the centralized system every five minutes. A second server may transmit status information to the centralized system every three minutes. A first application program may transmit status information to the centralized system only upon occurrence of specified events (e.g., when a request to load a web page is received).

The centralized system may store this status information and, when it is time to generate a signature (e.g., upon expiration of the 10 seconds), may generate a signature using the stored status information. Thus, the servers and application programs may generate status information according to their own procedures, and the centralized system may use the most-recent status information for each server or application program to generate a network-wide signature.

The centralized system can include an anomaly detection device that analyzes signatures to determine if there is an anomaly in the operation of one or more servers or application programs. For example, the anomaly detection device, which may be a computer program executing on a computer server programmed to detect anomalies in the manner discussed here, may identify historical norms in signature parameters (i.e., the portions of the signature that represent the statuses of individual servers or application programs). If a signature is determined to fall outside of the historical norm, the anomaly detection device may generate an alert. The anomaly detection device may provide the alert to a user, or may provide the alert to an anomaly prevention device. The anomaly prevention device prevents the anomaly from impacting other servers and application programs in the network.

The centralized system can also include an anomaly predictor device. The anomaly predictor device (which may also be implemented by a computer program on a computer server) may include a machine learning system. The anomaly predictor device may be trained to identify anomalies in the network. The training may occur, for example, by the anomaly predictor device receiving multiple determined anomalies and the historical data that represents, at times of the determined anomalies: (i) the statuses of the servers and application programs in the network, and (ii) the relationships between the servers and application programs. The machine learning system may also train on historical data that represents the statuses of servers and application programs and their relationships when anomalies were not determined to occur. Based on this training, the anomaly predictor device may identify specific states of the network that cause anomalies. Thus, the anomaly predictor may monitor recently generated signatures and relationship data to predict whether or not an anomaly is soon to occur.

The centralized system can also include an anomaly preventer. The anomaly preventer may receive a signal from the anomaly detector or the anomaly predictor that an anomaly has occurred or is likely to occur in the near future. The anomaly preventer can reconfigure the network to isolate the anomalous server or application program. In other words, the anomaly preventer may know the relationships between the servers and the application programs, and can request that those servers or application programs that are in communication with the anomalous server or application program move such associations to other servers or application programs. This movement of associations can occur, for example, with an application program being transferred from an anomalous server to a non-anomalous server, or with an application program that is requesting data from an application program on the anomalous server to instead request the data from an application program on a non-anomalous server.

FIG. 1 shows a network of computer servers and application programs. In this illustration, a user 102 is using device 104 to access a web page of a social network. The social network is provided by a network 110 of computer servers and application programs. Each of the computer servers includes one or more application programs. In other words, one or more application programs execute from the computer memory and processing capabilities of a single computer server. A computer server may be a physical computerized device, a web server, or a virtual machine. An application program is a computer program that executes on one or more servers.

The device 104 sends an initial request for the web page to the social network front end server 112. The request includes the user's username and is received by web server software 114 on the server social network front end server 112. Examples of web server software include the APACHE HTTP SERVER and the ORACLE IPLANET WEB SERVER. In this illustration, the social network front end server 112 includes a template for the web page that is to be provided for display to the user, but the template web page does not include user-specific data. This user-specific data is requested from database application 118 at the social network server 116. The database application 118 uses the username to access user-specific data. For example, the database application 118 retrieves a list of the user's friends and the user's full name, and provides this information to the web server software 114. An example database program is MYSQL.

The web server software 114 provides a web page for display on the user device 104. The web page includes code that requests further data upon user-device loading of the web page. For example, JAVASCRIPT code in the web page requests the user's profile picture and pictures of the user's friends from the photos front end server 120. The web software 122 at the photos front end server 120 receives the request. Multiple individual backend photos servers (e.g., servers 124 and 128) include application programs (e.g., photos application programs 126 and 130) that can each provide the requisite photos. Thus, the web server software 122 can act as a load balancer to distribute the request to a backend server that is available.

Similarly, the JAVASCRIPT code in the web page may request advertisements for display in the web page. The advertisements may be requested from web server software 134 on advertising front end server 132. The advertising front end server 132 may serve as a load balancer for multiple back end advertising servers 136 and 140 that include advertising application programs 138 and 142 for determining one or more advertisements to display in the web page.

Although FIG. 1 illustrates each server as including a single application program, each server may run multiple application programs. For example, a single server may run a photos application program, a video application program, and a search engine searching application program. Further, application programs of a first type may request data from application programs of a second type. For example, the web server software 114 may, in addition to requesting data from the database application 118, directly request photos from the photos front end server 120 and advertisements from the advertising front end server 132.

The network can include software programs that allocate application programs to different servers and that bring additional servers online. For example, if a specific video is becoming popular to users in Brazil, but users in Brazil are not requesting many photographs, the allocation software program can reduce the number of photos application programs and can increase the number of video application programs that are operating out of servers that are physically in or near Brazil. In some examples, the video application programs are copies of each other and can each respond to a request for the popular video.

Figure 2:
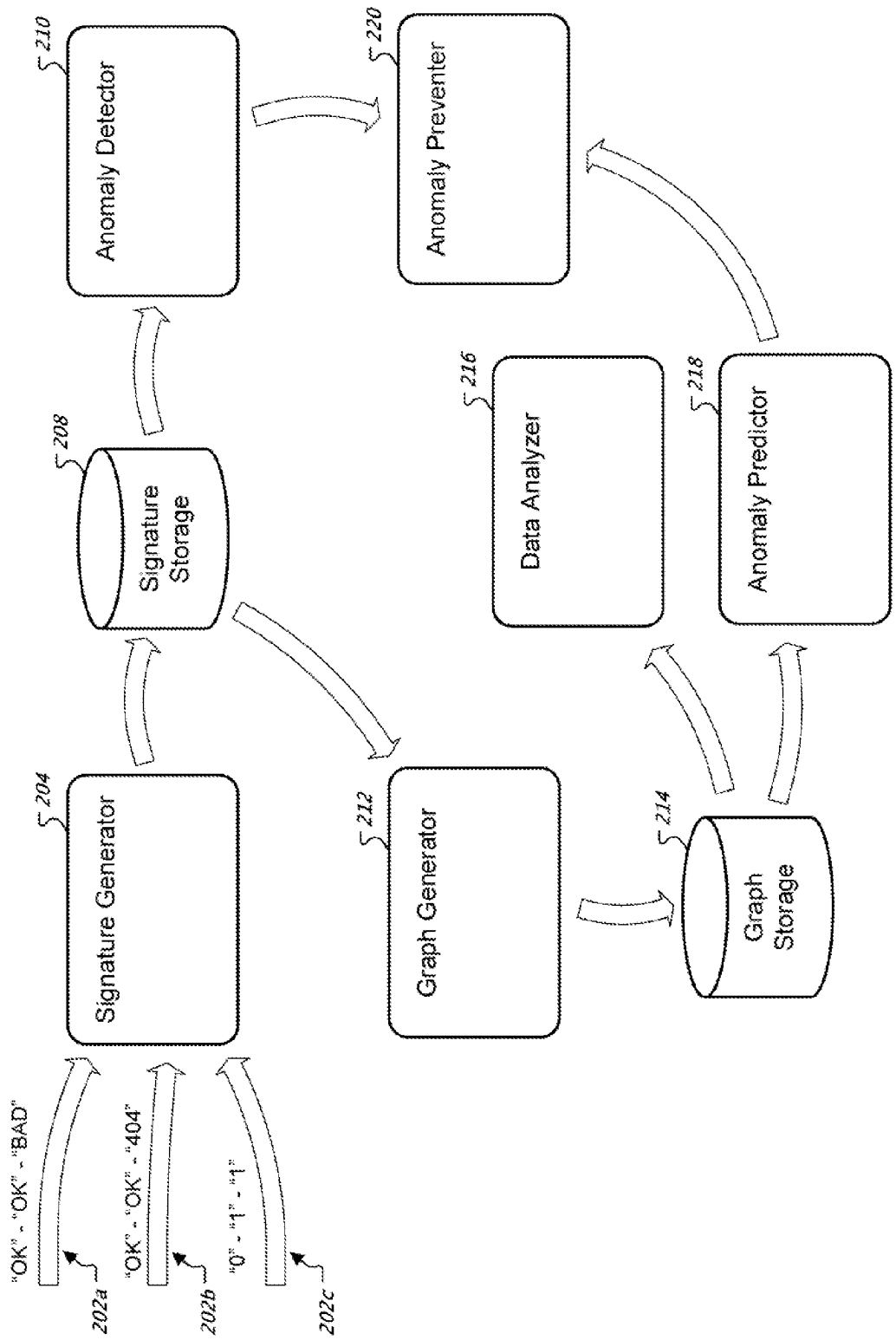
FIG. 2 shows a schematic illustration of a system for correlating status information that is generated in a computer network.

FIG. 2 shows a schematic illustration of a system for correlating status information that is generated in a computer network. The system includes a signature generator 204 that receives sets of status information 202a, 202b, and 202c from computer servers and application programs in a network. The signature generator generates signatures using the received information and stores the signatures in the signature storage 208. An anomaly detector 210 analyzes the generated signatures to identify anomalies.

The graph generator 212 generates data that represents graphs of the status information for the servers and application programs, and the relationships between the servers and application programs. The data that represents the graphs is stored in graph storage 214. The data analyzer 216 allows a user to view the statuses and the relationships at various points in time. The anomaly predictor 218 is trained to predict anomalies before they occur. The anomaly preventer 220 receives indications of anomalies that have occurred or that are predicted to occur, and isolates corresponding servers or application programs to avoid further anomalies.

Figure 3:
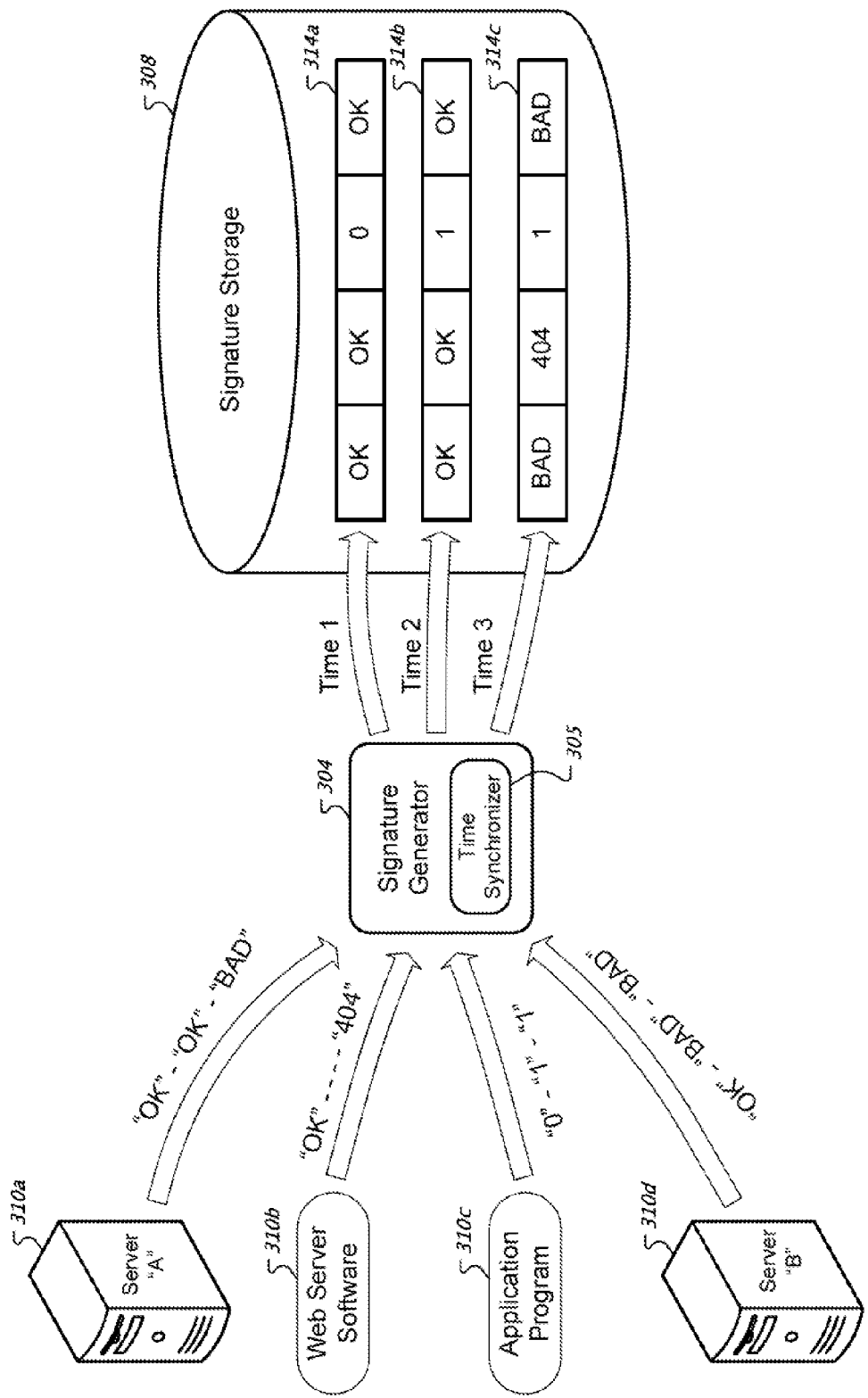
FIG. 3 shows a signature generator that receives status information and generates network signatures using the received status information.

The operation of the signature generator 204 is shown in greater detail in FIG. 3. The signature generator 304 in FIG. 3 receives status information from multiple servers and application programs (e.g., servers and application programs 310a-d). The status information may be transmitted by the servers and application programs to the signature generator 304 as the status information is generated (e.g., without request by the signature generator), or may be stored upon generation and transmitted upon request by the signature generator 304. In this example, server "A" 310a provided the status information "OK" at a first time, "OK" at a second time, and "BAD" at third time.

The signature generator 304 generates "snapshots" of the known statuses of the servers and application programs. Each snapshot may be referred to as a network signature, and may include the last-known status of each server and application program in the network. Each signature may be stored in signature storage 308. In this illustration, the signature generator has generated three signatures 314a-c for three respective times (e.g., the signatures were generated two minutes apart and represent the times 5:14 am, 5:16 am, and 5:18 am).

In some examples, the signature generator 304 generates the signatures at regular intervals. In various examples, the servers and application programs do not update their status information between every interval. For example, the web server software 310b may not send its status to the signature generator 304 as often as the signature generator 304 creates signatures. Thus, in this example, the signature generator creates two signatures 314a and 314b that are based on a single status (i.e., the "OK" status) that has been received by the signature generator 304 from the web server software.

In some examples, a server or application program generates status information more frequently than is recorded by the signature generator 304 in signatures. For example, server "A" 310a may update its status every one second, but the signature generator 304 may generate a signature every ten seconds. Thus, the signature storage 308 may not include all status information that is generated by the servers and the application programs in the network.

Status information may take various forms. Example status information for web server software includes: (1) request received, (2) request processed, (3) request returned, (4) error codes, (5) "ok" codes, (6) login details (e.g., internet protocol of requester), and (7) Uniform Resource Locator (URL) requested. Example status information for a photo application program includes: (1) slide show viewed, (2) picture downloaded, and (3) permission to requested photograph denied. Example status information for a server includes: (1) memory usage, (2) central processing unit (CPU) usage, (3) an indication that the server rebooted, (4) network usage, (5) available hard disk memory available, (6) temperature of server, and (7) operational status (e.g., "ok" or "down"). Accordingly, the content of a signature that references "APACHE status, Page views, Network usage, CPU usage, and MYSQL status" of a few servers and application programs may be "False, 1900, 40, 80, False."

In some examples, the status information that is received from the servers and the application programs is associated with time stamps. The time stamps may be times at which the status information was received by the signature generator 304, or may be times at which the status information was generated by the servers and application programs. The servers and application programs, however, may not have synchronized clocks and thus time stamps that are added by different servers and application programs at a single moment in time may have different time stamps. Accordingly, a time synchronizer 305 may apply new time stamps to the received status information. The new time stamps may be based on a single clock.

As an example, suppose that the clock for server "A" 310a is off by two minutes from the clock of server "B" 310d. Thus, status information that is generated by the servers at the same time may be accompanied by the time stamps "3:30 am" and "3:32 am," respectively. The time synchronizer 305 at the signature generator 304 can determine that there is a two minute offset between the two servers (e.g., by analyzing the time stamps of known events) and can add new time stamps to the received status information so that the time stamps for the status information is synchronized. For example, the time synchronizer may change the time stamp for the status information that is received from server "A" 310a from "3:30 am" to "3:32 am."

Returning to FIG. 2, the graph generator 212 generates data that indicates relationships between the servers and computer programs at different points in time. In some examples, these different times coincide with the times that are associated with the signatures. Thus, a user of the described system may be able to view a signature for 4:50 pm the day prior and the relationships between the servers and computers at 4:50 pm the day prior (e.g., the most-recent relationships known to the graph generator 212 at 4:50 pm the day prior). In some examples, the generated data represents a graph, where the nodes in the graph indicate the status information at a particular time, and the relationships between the nodes represent the relationships at the particular time. Such a graph is described in more detail with respect to FIGS. 4A-4D.

Figure 4A:
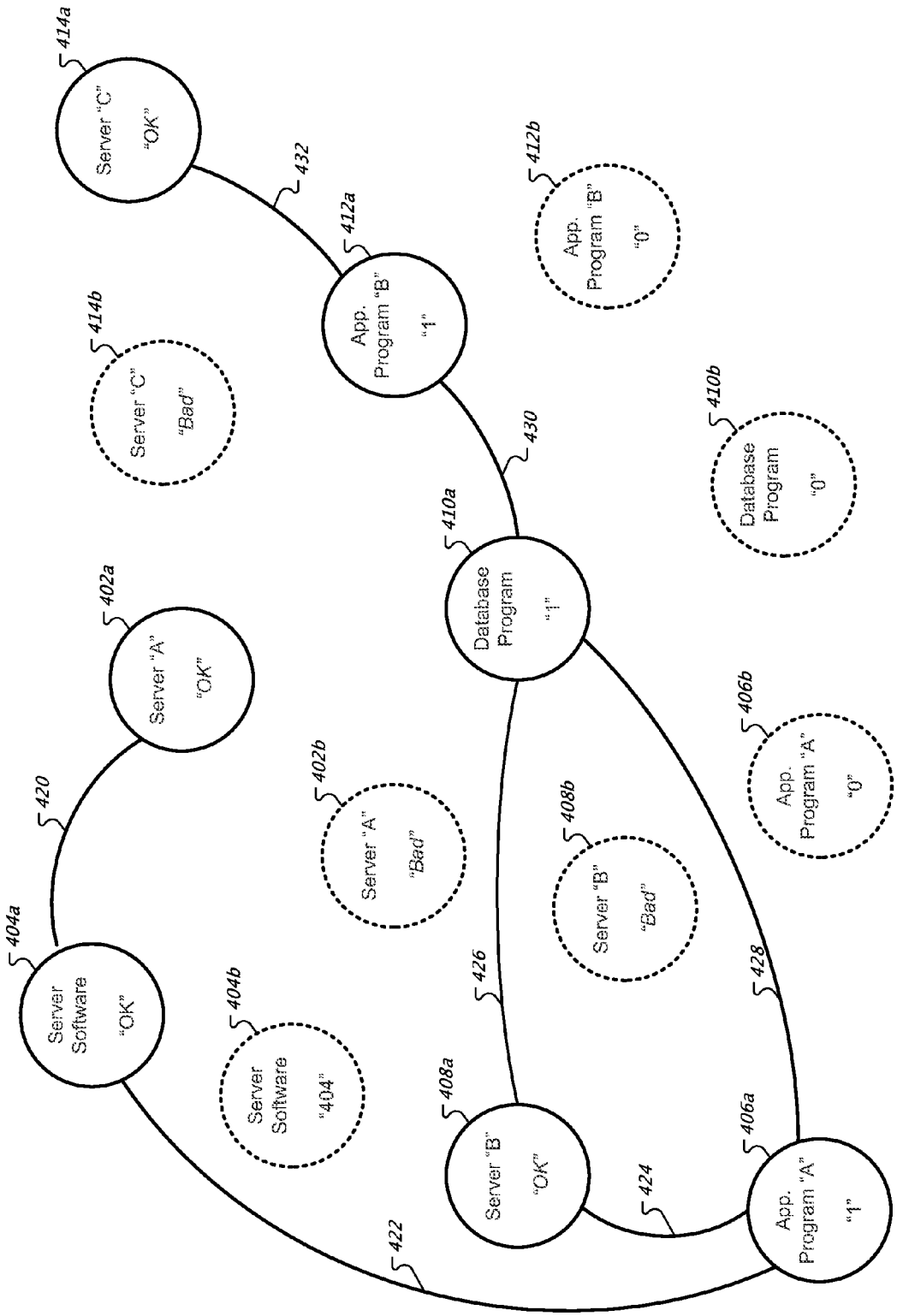
FIGS. 4A-D show graphs that conceptually illustrate the statuses of servers and application programs in a network.

FIG. 4A shows a graph that conceptually illustrates the statuses of servers and application programs in a network. In this illustration, the nodes (e.g., nodes 402a-b, 404a-b, 406a-b, 408a-b, 410a-b, 412a-b, and 414a-b) represent states of servers and application programs in the network. In this example, each server or application program has two associated nodes. Although each server or application program is illustrated as having only two nodes for purposes of clarity and illustration herein, each server or application program may have multiple additional states and corresponding nodes (e.g., 34 nodes).

The nodes are connected by relationships (e.g., relationships 420, 422, 424, 426, 428, 430, and 432). The relationships represent a dependency or interaction between the nodes that are connected with the relationships. Relationships may be formed between nodes that represent: (1) an application program that is executing on a server and the server, (2) a first application program and a second application program because the first application program sent a request to the second application program, (3) a first server and a second server because a first application program on the first server sent a request to a second application program on the second server, and (4) a first application program and a second server because the first application program sent a request to a second application program executing on the second server.

As an illustration, node 402a is connected to node 404a with relationship 420 because the server software that is represented by node 404a is executing on the server that is represented by node 402a. Node 404a is connected to node 406a with relationship 422 because the server software of node 404a sent a request for data to the application program of node 406a. Node 406a is connected to node 408a with relationship 424 because the application program of node 406a is executing on the server of node 408a. Node 406a is connected to node 410a with relationship 428 because the application program of node 406a requested data from the database program of node 410a.

The database program of node 410a happens also to execute on the server of node 408a, and thus a relationship 426 connects node 410a to node 408a. Node 410a is connected to node 412a with relationship 430 because the application program of node 412a also sent a request to the database program of node 410a (even though the request may be unrelated to the sequence of requests that are associated with relationships 422 and 428). Node 412a is connected to node 414a with relationship 432 because the application program of node 412a is executing on the server of node 414a.

In this illustration, relationships are only formed between nodes that represent examples (1) and (2) above, although further relationships (e.g., the relationships of examples (3) and (4)) could be implemented in various implementations.

The graph of FIG. 4A represents a state of the network when all servers and application programs are fully operational. Thus, the graph represents a conceptual image of the computer network's status and the relationships between its components at a particular time.

Figure 4B:
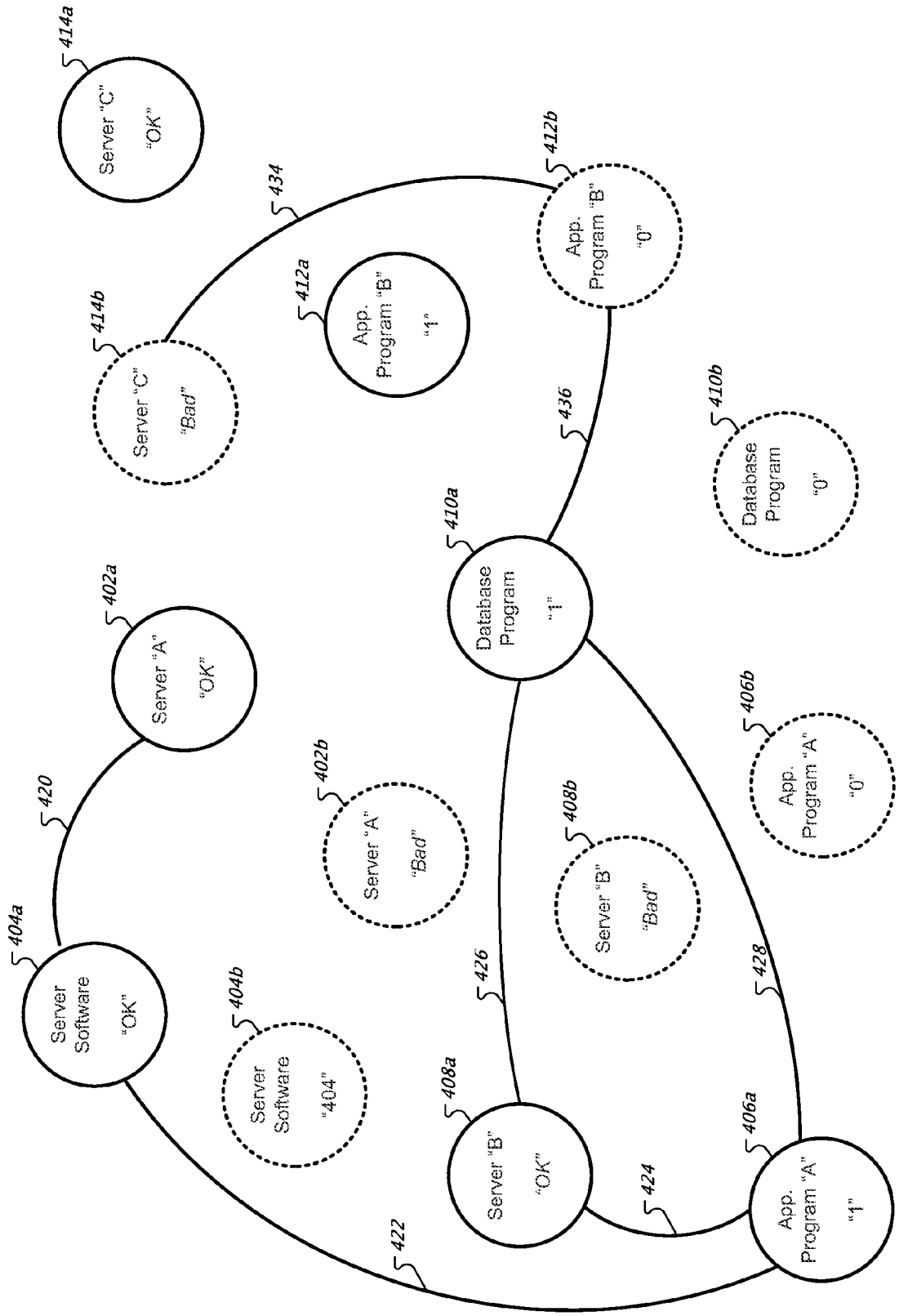
Figure 4C:
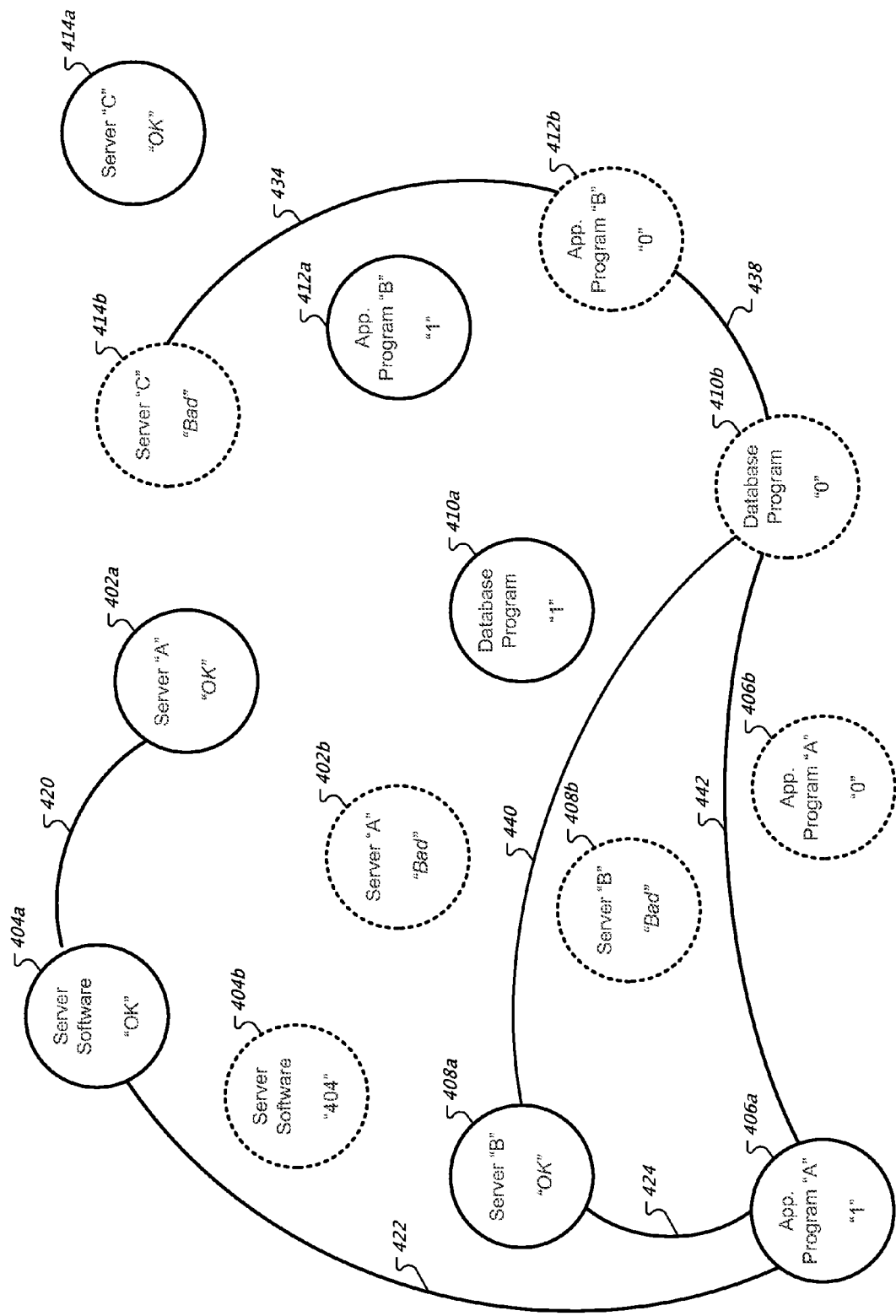
Figure 4D:
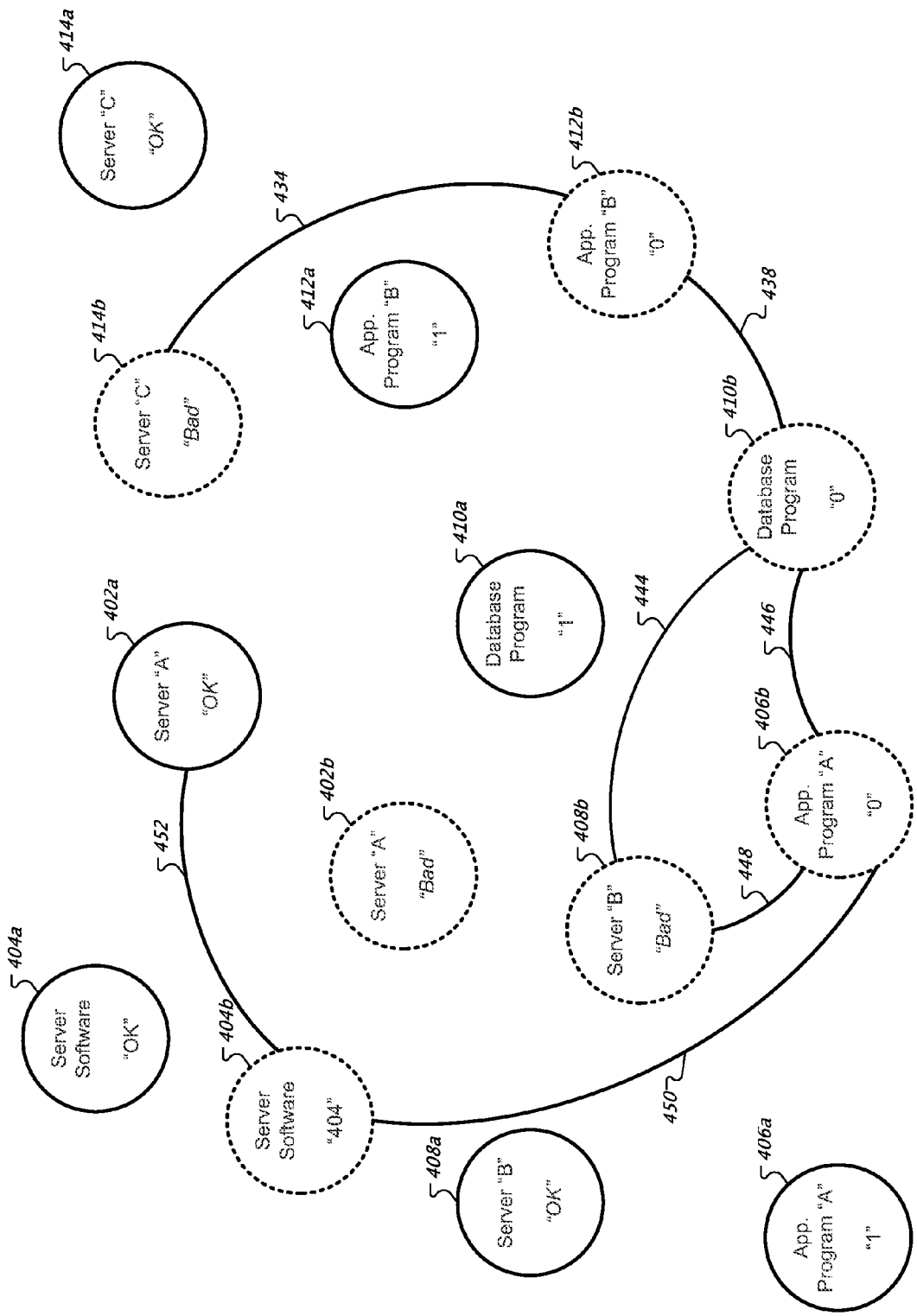

FIGS. 4B-D show graphs that illustrate a progression of the network as an operational anomaly forms in a server and spreads across the network to affect application programs and other servers. In FIG. 4B, the server of nodes 414a-b suddenly overheated and went offline, bringing down the application program of nodes 412a-b. Thus, the status of the server changes from "OK" (node 414a) to "Bad" (node 414b). The status of the application program transitions from "1" (node 412a) to "0" (node 412b), forming new relationship 434. Further, new relationship 436 is formed between nodes 410a and 412b. In some examples, most-recent statuses of servers and application programs are represented by nodes that have relationships to other nodes. The server of node 402a, the server software of node 404a, the application program of node 406a, the server of node 408a, and the database program of node 410a remain operationally active.

In FIG. 4C, the database program of nodes 410a-b has gone down (e.g., because the database program was improperly configured and a failure to receive an acknowledgment signal from the application program "B" caused the database program to go offline). Accordingly, relationships 436, 426, and 428 (FIG. 4B) transition to relationships 438, 440, and 442 (FIG. 4C).

In FIG. 4D, the anomaly has cascaded through the network, causing an error from further servers and application programs. For example, the server of nodes 408a-b may have been unable to handle the database program suddenly crashing, causing the server to reboot and the application program of nodes 406a-b (which was executing on the server of nodes 408a-b) to also fail. Because of the failure, the server software of nodes 404a-b may not be able to generate a web page for a user, and may instead generate a "404" error.

Accordingly, a user that receives a 404 error may only know that the APACHE web software indicated that a web page was not found. As described in more detail below, use of the graphs of FIGS. 4A-D allows a user or a computer system to trace the source of the error back to the server of nodes 414a-b. A computer system can also use such graphs to limit the spread of the anomaly.

In various examples, relationships may exist for extended durations of time. For example, a relationship may form between an application program and a server so long as the application program is executing on the server (e.g., when both the server and the application program were active), or so long as the application program last executed on the server (e.g., when the server and the application program were active but where the application program has crashed). A relationship between a server and an application program, however, may be destroyed when the application program is moved to a different server.

In some examples, relationships between servers and application programs are limited by time. For example, upon a first application program sending a request to a second application program, a relationship may form between the two application programs for (i) a single graph, (ii) five graphs, or (iii) a determined amount of time (e.g., ten seconds).

In some implementations, a representation of a graph includes a single node for each server or application program, and the status information is identified within the node. For example, instead of multiple nodes that represent the multiple statuses of a server, a single node may represent the server and all the status information for the server may be stored with the node. Thus, a relationship between a server and an application program executing on the server may not change as the status of the server or the application program changes, but the content of the nodes may change.

Returning to FIG. 2, data that represents the graphs of FIGS. 4A-4D may be stored in the graph storage 214. The data analyzer 216 may access the data in the graph storage 214 to allow a user to view representations of the data (e.g., visual depictions of graphs) for different times. Thus, a user of the data analyzer 216 can trace errors that may have occurred with a specific server or application program back to its source by viewing the errors that have previously or concurrently occurred on other servers or application programs that are connected with relationships.

Further, the nodes and the relationships in the graphs may individually be associated with geographical information and user information. For example, a request between a first application program and a second application program may have been requested by a specific user. The first application program may be executing on a first server that is in a first geographical region and the second application program may be executing on a second server that is in a second geographical region. Some relationships and some statuses may be associated with a plurality of geographies and a plurality of users.

As such, the user of the data analyzer 216 may pivot around specific geographies and users to view servers, application programs, and relationships that are associated with such specific geographies or users. Thus, a user of the data analyzer 216 may graphically view whether errors or increased data usage occur when a specific user logs into the network (e.g., because the user maliciously downloads large quantities of video data from the network). Similarly, the user of the data analyzer 216 may view whether errors are generated for a specific geography (e.g., at a specific collection of servers because network usage at the specific collection of servers is especially high, indicating that other servers should be brought online or the servers in communication with the specific collection of servers could be moved into the geographical area to reduce network usage).

The anomaly predictor 218 can predict that an anomaly is likely to occur. The anomaly predictor may include a machine learning system. The machine learning system may be trained on previous anomalies that have occurred in the network. For example, the machine learning system may be fed multiple historical anomalies and times when the anomalies occurred. The machine learning system may obtain status and relationship information for the times of the anomalies and the times prior to the anomalies from the signature storage 208 and the graph storage 214. The machine learning system may also be fed multiple times when few or no anomalies were present in the network, and may obtain the status and relationship information for such times. The machine learning system may analyze the status and relationship information for the anomalous time and the non-anomalous times to determine characteristics of the network that are common to states of the network that precede the multiple historical anomalies, and thus are predicted to cause such anomalies in the future.

Upon being trained, the anomaly predictor 218 may monitor the data in the graph storage 214 as it is generated by the graph generator 212 (e.g., a run-time monitoring of the network). Should the anomaly predictor (e.g., the machine learning system at the anomaly predictor) determine that an anomaly is likely to occur, the anomaly predictor may generate an alert. In some examples, the anomaly predictor trains on anomalies that are detected during run-time (e.g., anomalies that are detected by the anomaly detector 210).

The anomaly detector 210 monitors the signatures that are generated and stored in the signature storage 208, and determines whether a signature represents an operational failure of one or more servers or application programs, or a deviation of one or more servers or application programs from historical norms. A deviation or an operational failure may correspond to a status of a server or an application program that does not conform to established normal behavior of the computer server or application program.

For example, the anomaly detector may monitor the signatures in the signature storage 208 and may generate statistical bounds of status information based on historical values in the signatures over the monitoring period. In some examples, the status information in a signature may be binary (e.g., "Good" or "Bad") and an anomaly may simply be the "Bad" status. In some examples, however, the status information may cover a continuum (e.g., "80% CPU utilization" or "98% CPU utilization") and an anomaly may occur upon the status information falling outside of determined historical norms (e.g., falling outside of two standard deviations from historical norms).

In some examples, anomalies are detected upon a collection of servers or application programs falling outside of statistical norms. For example, a single machine exceeding 90% CPU utilization may not trigger the anomaly detector to issue an alert, but a collection of machines that are connected with relationships exceeding 90% may trigger the anomaly detector to issue an alert.

The anomaly preventer 220 can receive an indication from the anomaly detector 210 that an anomaly has occurred, and can prevent the anomaly from impacting further servers and application programs in the network. For example, the anomaly detector 210 may generate an alert that an anomalous server is reporting abnormally high CPU usage. Multiple application programs may be operating on the anomalous server, and the anomaly preventer 220 may request that at least some of the application programs are transferred to one or more different servers to relieve the burden on the anomalous server.

In some examples, the anomaly preventer 220 isolates anomalous servers or application programs from other servers and application programs in the network. This isolation can be implemented by intentionally severing or restructuring the relationships between the anomalous servers and application programs and other servers and application programs in a graph of the network (e.g., a most-recently generated graph that is stored in the graph storage 214). A relationship between a particular application program that is running on an anomalous server can be restructured by transferring execution of the particular application program to a non-anomalous server (e.g., by executing a copy of the particular application program on another server and designating the copy with the same identifier as the particular application program so that requests are routed to the copy, and bringing the particular application program at the anomalous server offline).

A relationship between an anomalous application program and a server can be restructured by bringing a copy of the anomalous application program online, and optionally shutting down the anomalous application program. A relationship between an anomalous application program and a non-anomalous application program can similarly be restructured by bringing a copy of the anomalous application program online, and optionally shutting down the anomalous application program. Accordingly, at least some (and maybe all) of the requests that were intended for the anomalous application program are transferred to the copy of the anomalous application program. In some examples, the copy is already executing before the anomalous application program or server is identified.

An anomalous server or application program can also be isolated (in whole or in part) by severing relationships with the anomalous server or application program. A relationship may be severed by terminating communication between application programs in a constructive manner or shutting down application programs or servers in a constructive manner (as opposed to unintended crashes in an application program or server). Non-anomalous servers or application programs may be able to handle constructive terminations, but may have more difficulty handling unintended crashes.

In some examples, the anomaly preventer 220 receives an indication of a predicted anomaly that the anomaly predictor 218 has determined is likely to occur. In some examples, the anomaly preventer 220 prevents the predicted anomaly from occurring by bringing additional servers or application programs online to handle the burden imposed on the anomalous server or application program. In other examples, the anomaly preventer 220 prevents the predicted anomaly from occurring (or prevents it from spreading if it occurs) by isolating the anomalous server or application program from other servers or application programs (as described above).

In some examples, the anomaly preventer 220 takes a more proactive approach to preventing the spread of a detected anomaly or a predicted anomaly by isolating servers or application programs that are in a relationship with the detected or predicted anomalous server or application program, but that are not yet in an anomalous state, or are not yet predicted to be anomalous. For example, if an application program is determined to be anomalous (e.g., because it crashed), the anomaly preventer 220 may isolate the anomalous application program and all of the servers and application programs that have a relationship with the anomalous application program (e.g., in a most-recently generated graph). Thus, should the anomaly spread before such relationships can be severed or transferred, the anomaly may still remain contained.

Figure 5:
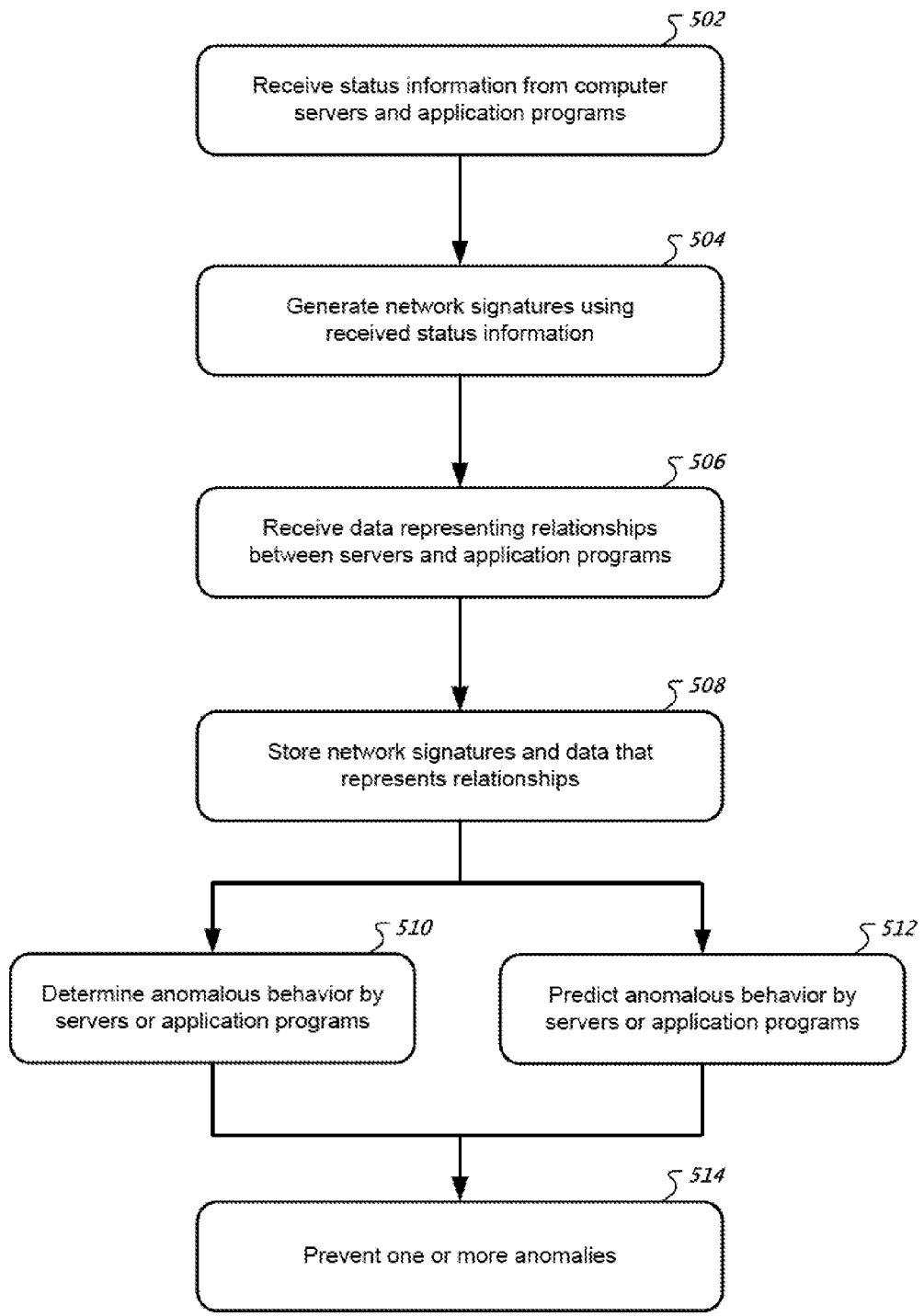
FIG. 5 is a flowchart for correlating status information that is generated in a computer network.

FIG. 5 is a flowchart for correlating status information that is generated in a computer network. In general, the process shown in the figure operates by generating network signatures from status information received from a number of nodes in a network, and relationships between servers at certain nodes and applications executing on particular ones of the servers, and anomalous behavior is determined and predicted by analyzing historical signature data that represents past anomalous behavior in the system. Steps may then be taken automatically via the process to remedy determined anomalous behavior or prevent predicted anomalous behavior.

In box 502, status information is received from computer servers and application programs. For example, the signature generator 204 repeatedly receives status information from servers and application programs in a network. In some examples, the status information from the servers and application programs is received at different times based on when the status information is generated by the servers and application programs. In some examples, the status information is received in response to the signature generator 204 requesting the status of the servers and application programs.

In box 504, network signatures are generated using the received status information. For example, the signature generator 204 may generate signatures at regular intervals (e.g., every thirty seconds), where each signature represents the most-recently received status information for each server and application program in the network.

In box 506, data representing relationships between servers and application programs is received. For example, the graph generator 212 may receive indications from servers and application programs of the servers on which application programs are executing, and of recent communications between application programs. An application program executing on a server may represent a relationship between the application program and the server, and an application program that has communicated with another application program may represent a relationship between the application programs.

In box 508, the network signatures and data that represents the relationships are stored. For example, the signatures may be stored in signature storage 208 and data that represents graphs that are generated using the data in the signatures and the received relationships may be stored in graph storage 214. In some examples, signatures and data that represents the graphs are not stored separately. For example, the relationship data may supplement the signatures without duplicating the status information. In another example, the data that represents the graphs includes the status information and the relationships data, and a separate set of signatures is not stored.

In box 510, anomalous behavior by servers or application programs is determined. For example, the anomaly detector 210 may determine that one or more servers or application programs have failed or have begun to operate outside of historical norms.

In box 512, anomalous behavior by servers or application programs is predicted. For example, the anomaly predictor 218 may determine that an anomaly at one or more servers or application programs is likely to occur in the future. The anomaly predictor may include a machine learning system that is trained to identify anomalies based on historical anomalies in the system.

In box 514, one or more anomalies are prevented. In the example where an anomaly has been determined to have occurred (as with box 510), further anomalies are prevented. In the example where an anomaly is predicted as likely to occur (as with box 512), the predicted anomaly can be prevented. In both examples, the system can bring additional resources online to prevent anomalies. For example, additional instances of application programs and additional servers may be brought online.

Further, in both examples, the determined anomaly or predicted anomaly can be isolated, for example, by restructuring the network so that the server or application program that is determined or predicted to be anomalous is isolated. In other words, the relationships that connect to the anomalous server or application program (e.g., as identified in the most-recently generated graph) may be transitioned to other servers and application programs, or may be terminated upon request (as opposed to an un-forced error that may occur if the anomaly spreads).

Figure 6:
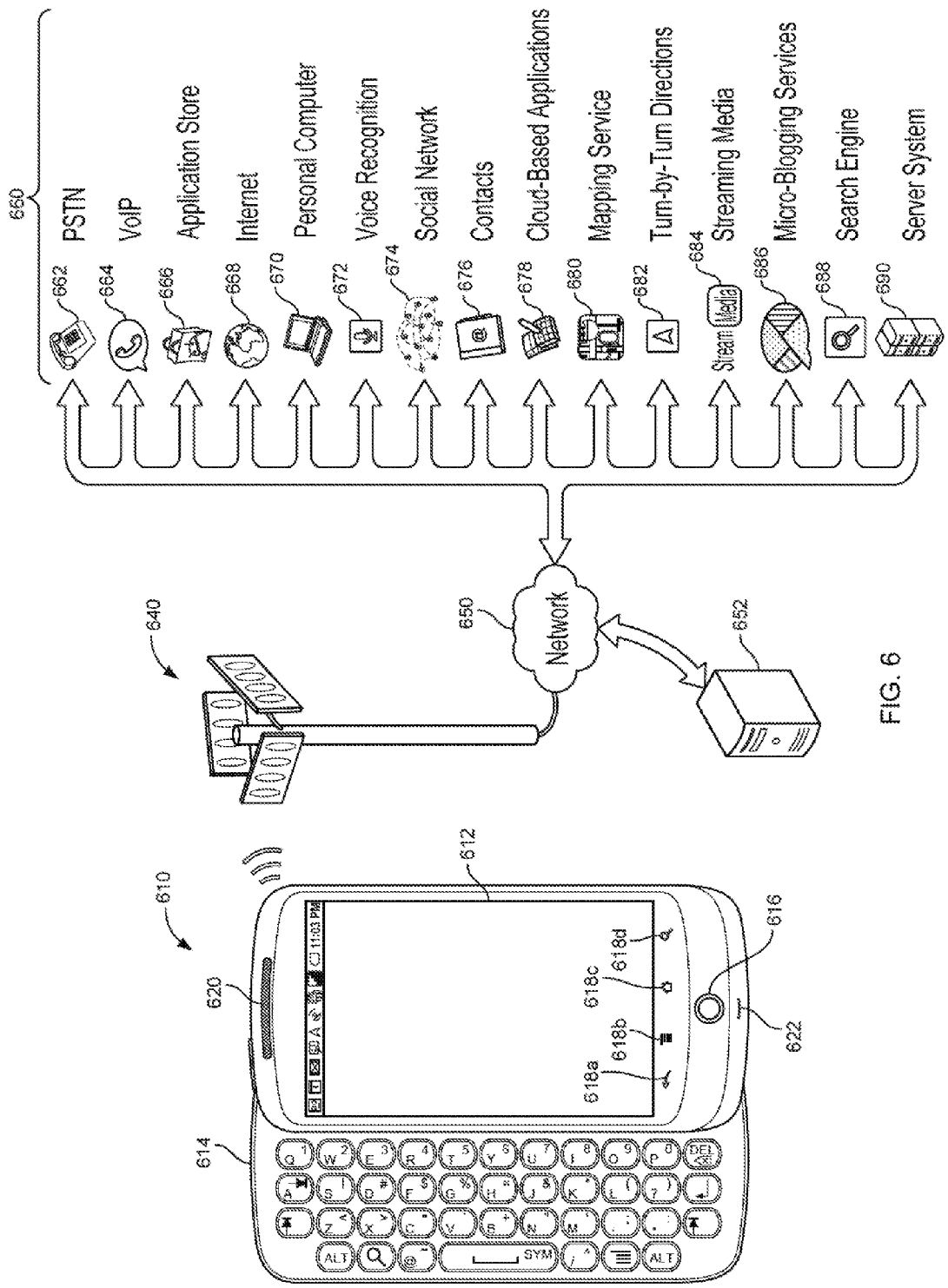
FIG. 6 is a conceptual diagram of a system that may be used to implement the systems and methods described in this document.

Referring now to FIG. 6, a conceptual diagram of a system that may be used to implement the systems and methods described in this document is illustrated. In the system, mobile computing device 610 can wirelessly communicate with base station 640, which can provide the mobile computing device wireless access to numerous hosted services 660 through a network 650.

In this illustration, the mobile computing device 610 is depicted as a handheld mobile telephone (e.g., a smartphone, or application telephone) that includes a touchscreen display device 612 for presenting content to a user of the mobile computing device 610 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 614, physical buttons, trackballs, accelerometers, gyroscopes, and magnetometers).

Example visual output mechanism in the form of display device 612 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 610. The mobile computing device 610 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a trackpad enables the user to supply directional and rate of rotation information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618a-d. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

In some examples, the operating system provides a "desktop" user interface that is displayed upon turning on the mobile computing device 610, activating the mobile computing device 610 from a sleep state, upon "unlocking" the mobile computing device 610, or upon receiving user-selection of the "home" button 618c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 610 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 610 may include other application modules and hardware. A call handling unit may receive an indication of an incoming telephone call and provide a user capabilities to answer the incoming telephone call. A media player may allow a user to listen to music or play movies that are stored in local memory of the mobile computing device 610. The mobile telephone 610 may include a digital camera sensor, and corresponding image and video capture and editing software. An internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., Ethernet, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computerized devices that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing devices associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call with a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the mobile computing device 610 with street maps, route planning information, and satellite images. An example mapping service is GOOGLE MAPS. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 7:
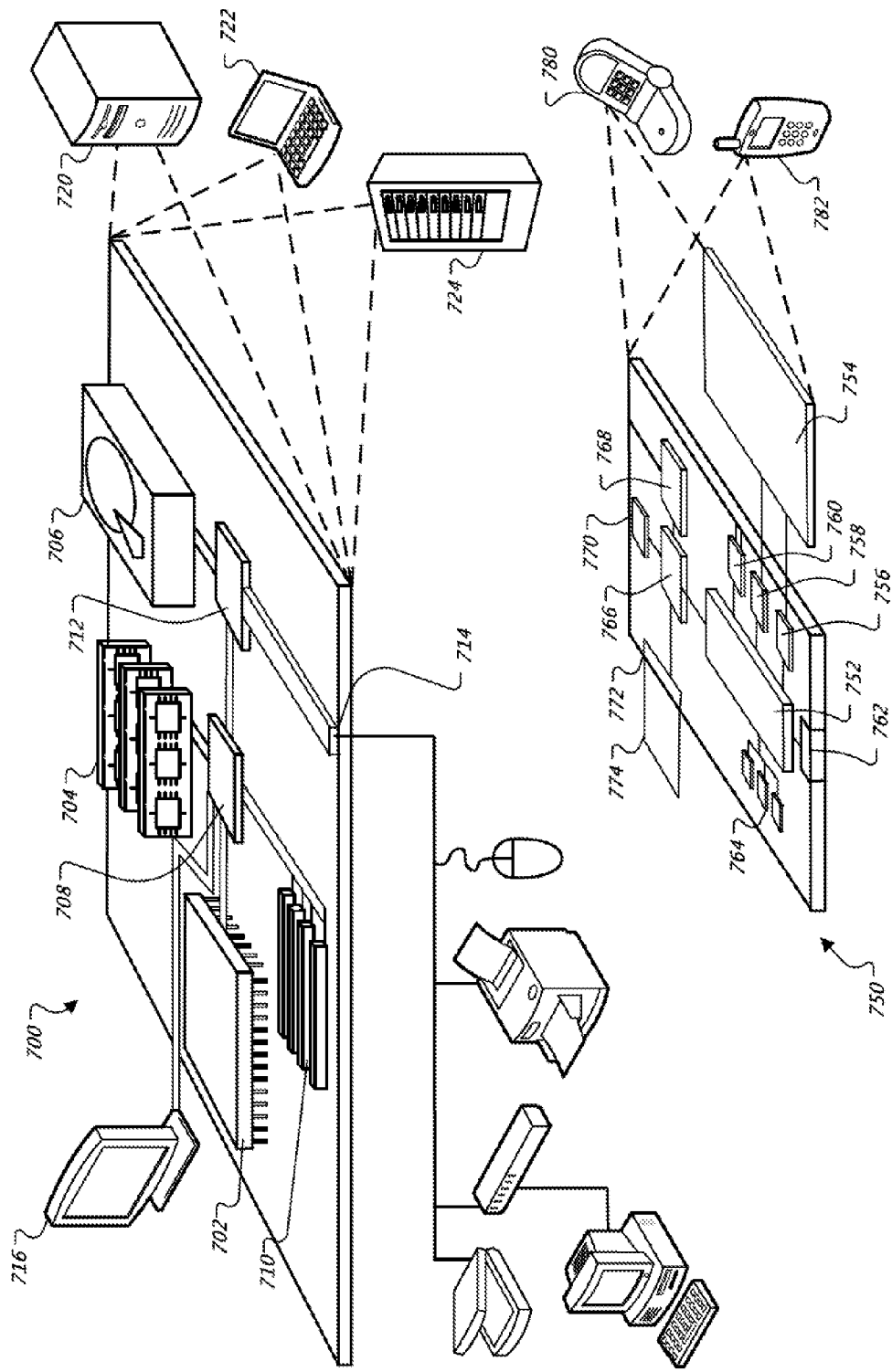
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 752 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for correlating status information generated in a computer network by computer servers and application programs, the method comprising:

receiving, by a computing system and for each particular computer server in a group of computer servers, server status information that identifies a status of the particular computer server at each of various times;

receiving, by the computing system and for each particular application program in a group of application programs that are executing on various ones of the computer servers in the group of computer servers, application status information that identifies a status of the particular application program at each of various times;

generating, by the computing system, a network signature for each of multiple times in order to generate multiple network signatures for the multiple times, wherein each particular network signature of the multiple network signatures identifies, for a respective one of the multiple times a status of each of the computer servers in the group of computer servers and a status of each of the application programs in the group of application programs, wherein generating the multiple network signatures uses (i) the server status information received for each particular computer server in the group of computer servers, and (ii) the application status information received for each particular application program in the group of application programs; and associating, by the computing system, each particular network signature of the multiple network signatures with data that identifies relationships, at a corresponding one of the multiple times, between (i) which application programs in the group of application programs were executing on which computer servers in the group of computer servers at the corresponding one of the multiple times, and (ii) which of the application programs in the group of application programs were in communication with each other at the corresponding one of the multiple times, wherein a first network signature of the multiple network signatures is associated with data that identifies relationships at a first time of the multiple times and a second network signature of the multiple network signatures is associated with data that identifies relationships at a second time of the multiple times.

2. The method of claim 1, wherein:

for each particular computer server in the group of computer servers, the various times for which the server status information identifies the status of the particular computer server, is indicated by a plurality of corresponding time stamps that were generated by the particular computer server and that were sent for receipt by the computing system along with the server status information; and for each particular application program in the group of application programs, the various times for which the application status information identifies the status of the particular application program is indicated by a collection of corresponding time stamps that were generated by a computer server on which the particular application program is executing and that were sent for receipt by the computing system along with the application status information.

3. The method of claim 2, wherein generating the network signature for each of the multiple times in order to generate the multiple network signatures includes synchronizing time stamps that were received from multiple of the computer servers in the group of computer servers and multiple of the application programs in the group of application programs, wherein the multiple of the computer servers and the multiple of the application programs did not generate the respective time stamps synchronously with each other.

4. The method of claim 2, wherein generating the network signature for each of the multiple times in order to generate the multiple network signatures includes generating network signatures at periodic time intervals, and wherein portions of the received server status information for each particular computer server in the group of computer servers and portions of the received application status information for each particular application program in the group of application programs is not received from all of the computer servers in the group of computer servers and all of the application programs in the group of application programs at periodic time intervals.

5. The method of claim 1, wherein generating the network signature for each of the multiple times in order to generate the multiple network signatures for the multiple times includes generating a plurality of the multiple network signatures using (i) a single status from the application status information received for a first application program from the group of application programs, and (ii) a plurality of statuses from the application status information received for a second application program from the group of application programs; wherein the single status is included in each of the plurality of the multiple network signatures without the computing system having received an updated status from the first application program for each of the plurality of multiple network signatures, and the plurality of statuses are included in the plurality of the multiple network signatures due to the computing system having received an updated status from the second application program for each of the plurality of multiple network signatures.

6. The method of claim 1, further comprising detecting, during a monitoring of the multiple network signatures as they are generated, an anomaly in the generated multiple network signatures, by identifying that one or more of the multiple network signatures does not conform to established normal behavior of the computer servers in the group of computer servers and the application programs in the group of application programs.

7. The method of claim 6, wherein the anomaly is determined to represent an operational failure of an anomalous computer server from the group of computer servers; and further comprising preventing the anomalous computer server from affecting operation of a first computer server by transferring requests by the first computer server that were intended for receipt by the anomalous computer server to a second computer server or application program.

8. The method of claim 7, further comprising preventing the anomalous computer server from affecting operation of a third computer server by transferring subsequent requests by the third computer server that were intended for receipt by the first computer server to a fourth computer server.

9. The method of claim 1, wherein each of the multiple network signatures includes the data that identifies the relationships for the corresponding one of the multiple times.

10. The method of claim 9, further comprising analyzing the multiple network signatures with a machine learning system to determine that a predicted anomaly in operation of a specific computer server from the group of computer servers or application program from the group of application programs is likely to occur in the future.

11. The method of claim 10, further comprising providing to the machine learning system, to train the machine learning system before determining that the anomaly is likely to occur:
  (i) multiple previous anomalies in operation of computer servers from the group of computer servers and in operation of application programs from the group of application programs, and
  (ii) network signatures for times that correspond to the multiple previous anomalies, including for each individual one of the network signatures for the times that correspond to the multiple previous anomalies (a) the status of each of the computer servers in the group of computer servers, (b) the status of each of the application programs in the group of application programs, and (c) the data that identifies the relationships at the corresponding time.

12. The method of claim 11, further comprising, in order to avoid the predicted anomaly, reconfiguring the relationships between (i) which application programs in the group of application programs are executing on which computer servers in the group of computer servers, and (ii) which of the application programs in the group of application programs are communication with each other.

13. The method of claim 12, wherein reconfiguring the relationships includes transferring execution of a first application program in the group of application programs from a first computer server in the group of computer servers to a second computer server in the group of computer servers.

14. The method of claim 13, wherein:
  the first computer server was predicted by the machine learning system to be a source of the predicted anomaly that is likely to occur in the future.

15. The method of claim 11, further comprising bringing more computer servers online to avoid occurrence of the predicted anomaly that is likely to occur in the future.

16. A system comprising:
one or more processors; and
one or more computer-readable devices including instructions that, when executed by the one or more processors, cause performance of operations that comprise:
  receiving, by a computing system and for each particular computer server in a group of computer servers, server status information that identifies a status of the particular computer server at each of various times;
  receiving, by the computing system and for each particular application program in a group of application programs that are executing on various ones of the computer servers in the group of computer servers, application status information that identifies a status of the particular application program at each of various times;
  generating, by the computing system, a network signature for each of multiple times in order to generate multiple network signatures for the multiple times, wherein each particular network signature of the multiple network signatures identifies, for a respective one of the multiple times a status of each of the computer servers in the group of computer servers and a status of each of the application programs in the group of application programs, wherein generating the multiple network signatures uses (i) the server status information received for each particular computer server in the group of computer servers, and (ii) the application status information received for each particular application program in the group of application programs; and
  associating, by the computing system, each particular network signature of the multiple network signatures with data that identifies relationships, at a corresponding one of the multiple times, between (i) which application programs in the group of application programs were executing on which computer servers in the group of computer servers at the corresponding one of the multiple times, and (ii) which of the application programs in the group of application programs were in communication with each other at the corresponding one of the multiple times, wherein a first network signature of the multiple network signatures is associated with data that identifies relationships at a first time of the multiple times and a second network signature of the multiple network signatures is associated with data that identifies relationships at a second time of the multiple times.

* * * * *